United States Patent [19]

Duruisseau

[11] Patent Number: 4,884,466
[45] Date of Patent: Dec. 5, 1989

[54] SCREW WITH RECIRCULATED SATELLITE ROLLERS

[76] Inventor: Bernard Duruisseau, Le Genevois, 74160 St. Julien en Genevois, France

[21] Appl. No.: 133,293

[22] Filed: Dec. 15, 1987

[30] Foreign Application Priority Data

Dec. 23, 1986 [CH] Switzerland ............. 5156/86-4

[51] Int. Cl.⁴ ............................................ F16H 1/18
[52] U.S. Cl. ............................ 74/424.8 C; 74/459
[58] Field of Search ............... 411/432, 433, 437; 384/454, 550, 566, 572, 609, 615; 74/424.8 C, 424.8 R, 459

[56] References Cited

U.S. PATENT DOCUMENTS

| | | | |
|---|---|---|---|
| 1,296,827 | 3/1919 | Lyons et al. | 384/454 |
| 3,182,522 | 5/1965 | Strandgren | 74/459 |
| 3,884,090 | 5/1975 | Dock | 74/424.8 C |
| 3,903,748 | 9/1975 | Krogsrud | 74/25 |
| 4,224,831 | 9/1980 | Nilsson | 74/424.8 R X |
| 4,375,770 | 3/1983 | Druet | 74/459 X |
| 4,699,530 | 10/1987 | Satoh et al. | 384/615 X |

FOREIGN PATENT DOCUMENTS

| | | | |
|---|---|---|---|
| 368952 | 2/1923 | Fed. Rep. of Germany | 384/454 |
| 805832 | 7/1949 | Fed. Rep. of Germany | 74/424.8 C |
| 2150739 | 4/1972 | Fed. Rep. of Germany | 74/424.8 R |
| 2111340 | 6/1972 | France | |
| 387391 | 1/1965 | Switzerland | 74/424.8 C |
| 484345 | 9/1975 | U.S.S.R. | 74/424.8 C |
| 222475 | 9/1926 | United Kingdom | 384/572 |

Primary Examiner—Gary L. Smith
Assistant Examiner—Douglas E. Ringel
Attorney, Agent, or Firm—Sandler & Greenblum

[57] ABSTRACT

Rollers situated on the circumference of a threaded screw inside a nut have a cavity at each end containing a spring and a pin. When a roller enters the recirculation groove, the spring/pin assembly bearing against the cap recirculates the roller towards the interior of the nut.

By enabling the roller to be repositioned at the time of its reinsertion between the threads of the screw and of the nut, this arrangement provides for flexible operation of the screw.

23 Claims, 2 Drawing Sheets

SCREW WITH RECIRCULATED SATELLITE ROLLERS

BACKGROUND OF THE INVENTION

The present invention has as its object a screw with recirculated satellite rollers used in mechanical engineering for imparting to any object an extremely precise movement of translation of the order of a micron.

Numerous situations are encountered in industry in which a piece is required to be displaced along a straight line over a very precise distance. This applies, for example, to an optical measuring instrument for a lens in which the position is adjusted in relation to a light ray. Another example is found in rolling mills where the space between two rollers measuring about 100 kg each is adjusted to an accuracy of 10 microns.

The problem in these situations is to convert a displacement which is visible on a human scale, i.e. of the order of a centimeter into an infinitesimal movement. One of the numerous methods of reduction available for this purpose consists in the rotation of a screw inside a fixed nut. For a screw with an average pitch of 1 mm, one complete turn of the screw corresponds to a longitudinal displacement of the screw by 1 mm and one hundredth of a turn corresponds to a displacement of 10 microns. It is at present easy to execute a rotation of 1/100 of a turn, for example with the aid of a handwheel 1 m in circumference connected to the screw or by means of an electric stepping motor.

Now the sliding friction which occurs particularly between a screw and its nut has the characteristic of abruptly decreasing at the beginning of a movement. In other words, the initial resistance to movement of a stationary screw is considerably greater than the resistance when the screw has already begun to rotate. This phenomenon hinders very small displacements since it is impossible to reduce immediately the couple initially applied to the screw for setting it in motion.

To overcome this disadvantage, a set of rollers with circular threads are placed round the screw between the screw and the nut to replace the sliding friction by a constant rolling friction. In order to reduce this rolling friction as much as possible, the whole arrangement is manufactured from a hard material such as steel and the cross-section of the threads of both the screw and the nut are set at 90° along straight sides so that there is only a single point of contact between each circular thread and the respective threads of the screw and the nut. A fresh problem then arises from the fact that these rollers, which turn with the screw, are also displaced in the longitudinal direction and are therefore liable to escape from the nut. It is therefore necessary to provide a mechanism to recirculate the rollers, that is to say to return them regularly to the center of the nut.

This recirculation is normally achieved by means of a longitudinal groove formed in the thread of the nut and two cams situated respectively at the entrance and exit of the latter. If, therefore, a roller moves into position in front of this groove in the course of its rotation around the screw, it is pushed away from the threads of the screw by one of the two cams which direct it towards the interior of the nut by a distance equivalent to one or two screw pitches according to the amount of projection of the cam. This roller is then pushed laterally by the roller cage to return to the correct threads where it resumes its course.

This system has, however, numerous disadvantages in operation. When the roller abuts against the cam, a slight shock is produced. When the system is used intensively, for example when there is a continuous reciprocating movement at a speed of 300 revs/min, the sequence of these shocks generates vibrations in the machine as a whole as well as producing unpleasant noise. Depending on the design of the machine, these vibrations are liable to amplify and result in premature wear which jeopardizes the general reliability of the machine. Moreover, the wear on the cam produces iron filings which are liable to infiltrate the screw threads and thereby destroy the precision of displacement of the screw.

Another disadvantage arises from the necessity of the roller to be displaced by the cam by a distance strictly equal to the pitch of the screw because otherwise a so-called "hard point" would be created, that is to say a significant amount of jamming at the moment when the roller re-engages with the threads of the screw and the nut. Since the cam and the roller are manufactured separately, this requires precise adjustment of the height of the shoulder of the cam and of the surface of contact of the roller in relation to its grooves. Such stringent conditions would result in a considerable proportion of the pieces manufactured being lost as rejects and would require very careful and delicate assembly which would increase the final cost of the screw.

SUMMARY OF THE INVENTION

It is an object of the present invention to resolve these problems by proposing a mechanism which in the first place prevents the occurrence of shocks. It should also allow in a general manner greater tolerance in the dimensions of the parts. Furthermore, the mechanism according to the invention should be assembled from standard parts or parts which are simple in design so that they can be more easily manufactured and assembled, thereby reducing the final cost.

These objects are achieved according to this invention by a screw with recirculated satellite rollers comprising a threaded nut, a threaded screw held at the center of the nut by a set of rollers arranged round its circumference, a clearance space for the recirculation of the rollers and a cap screwed to each end of the nut, leaving a free passage for the screw but retaining the rollers inside the nut, characterized in that the rollers are provided at each end with elastic means which tend to return them to the center of the nut.

According to one advantageous embodiment, the elastic means comprise a cavity formed in the axis of the roller and containing a spring pushing a pin out of the cavity, the said pin bearing against the threaded cap.

It may prove advantageous to manufacture the threaded cap of "Teflon" or nylon or some other plastics material.

According to a second embodiment, the elastic means bear against a ball race comprising the threaded cap, a series of balls optionally arranged in a ball track and a retaining washer.

According to a third embodiment, the retaining washer of the ball race forms an integral part of the roller cage.

According to a fourth embodiment, the rollers are held in position in relation to one another by two thick discs, an upper and a lower, each having recesses in which the smooth ends of the rollers are seated and each extending across the ball race on their respective caps.

According to another characteristic, one or more clearance grooves for the recirculation of the rollers are formed along the threaded screw.

As a variation, only one half of a roller has grooves, the other half remaining smooth, and these rollers are alternately placed in opposite directions round the circumference of the threaded screw.

BRIEF DESCRIPTION OF THE DRAWINGS

The invention is described below in more detail with reference to non-limiting exemplary embodiments illustrated in the drawings, in which.

DETAILED DESCRIPTION OF PREFERRED EMBODIMENTS

Figure 1:
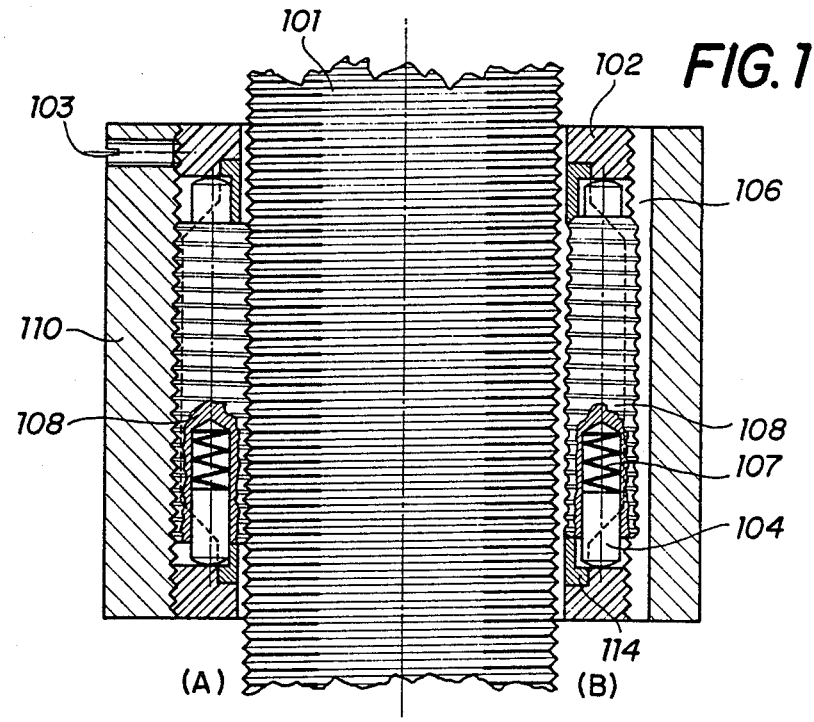
FIG. 1 represents a longitudinal section through the screw with recirculated rollers, in which the threaded screw is shown in solid view and only the lower part of the rollers is shown in section.

Referring to FIG. 1, the mechanism comprises a threaded nut 110, a threaded screw 101, a set of rollers 108 with circular grooves interposed between the screw and the nut and two caps 102, an upper and a lower, which leave a free passage for the threaded screw but retain the rollers inside the nut. Each cap is fixed in position by a screw 103. As shown on side A of FIG. 1, the grooves of the rollers 108 engage both with the threads of the nut 110 and with the threads of the screw 101. These grooves are manufactured in the conventional manner so that they have only a single point of contact with each respective thread in order to reduce the rolling friction. These rollers are held in position in relation to one another by a cage 114, the base of which is free to rotate in the caps 102. Since only rolling frictions come into play, the screw 101 can thus be rotated very slowly as required.

The nut 110 is generally integrally connected with the framework of the machine and the screw is then used to displace the piece whose position is required to be adjusted. The arrangement could also be used conversely. In that case, the threaded screw supported by bearings would be integrally connected with the axis of a motor by which it is rotated, resulting in translation of the nut along the screw.

It will be obvious that when the screw rotates, the rollers roll both along the screw and along the nut, thereby executing a movement of translation along the nut in the direction towards one of the two caps. In order to enable the rollers to be recirculated when they arrive at an end position, a clearance groove 106 extending longitudinally is formed in the threading of the nut, as shown on side B of FIG. 1.

During the movement of translation of the roller, the pin 104 bearing against the corresponding cap 102 compresses the adjacent spring 107. When the same roller is in the clearance groove, it is no longer held against the side of the nut, and under the action of the spring it becomes separated from the threads of the screw. It is then free to move. The compressed spring 107 then extends, pushing the roller back to the middle of the nut. Once returned to the mid-position, two springs 107, the upper and the lower, balance out and the roller is stabilized.

The cage 114, driven by the other rollers, pushes the free roller to return to position between the threads of the nut and of the screw. A subsequent upward or downward displacement of the roller, as the case may be, is imparted to the grooves by the threads. Whereas the presence of the cam would prevent this movement in one or other direction, thus creating a "hard point", it can now take place quite smoothly by virtue of the springs 107.

The width of the groove 106 is normally approximately equal to the diameter of the roller so that only one roller will be released at a time. Laboratory tests have shown that if the number of rollers is large, for example greater than 10, it is advantageous to form a groove equal in width to the distance between two adjacent rollers so that one roller is released at the moment when its predecessor is reintegrated between the threads as this is the best way to attenuate the slight shock.

It should be noted that the length of each roller 108 and the thickness of the caps 102 are not critical. The formation of apertures at each end of the rollers is a simple manufacturing operation. Springs and pins of average tolerance are available commercially at low cost. Assembly can be facilitated by coating the sides of the pins with a viscous grease which keeps them in position in the rollers during assembly. The invention thus enables screws with better performance to be obtained at less cost.

In the basic version, the rounded ends of the pins 104 rub against the threaded cap 102 as they move round the internal circumference of the nut 110. To reduce the intensity of these sliding frictions, it may be preferred to manufacture these caps from "Teflon", nylon or plastics. Furthermore, the caps may be provided with parts which fit somewhat tightly against the screw 101 and thereby serve to sweep away the dust.

Figures 2, 3:
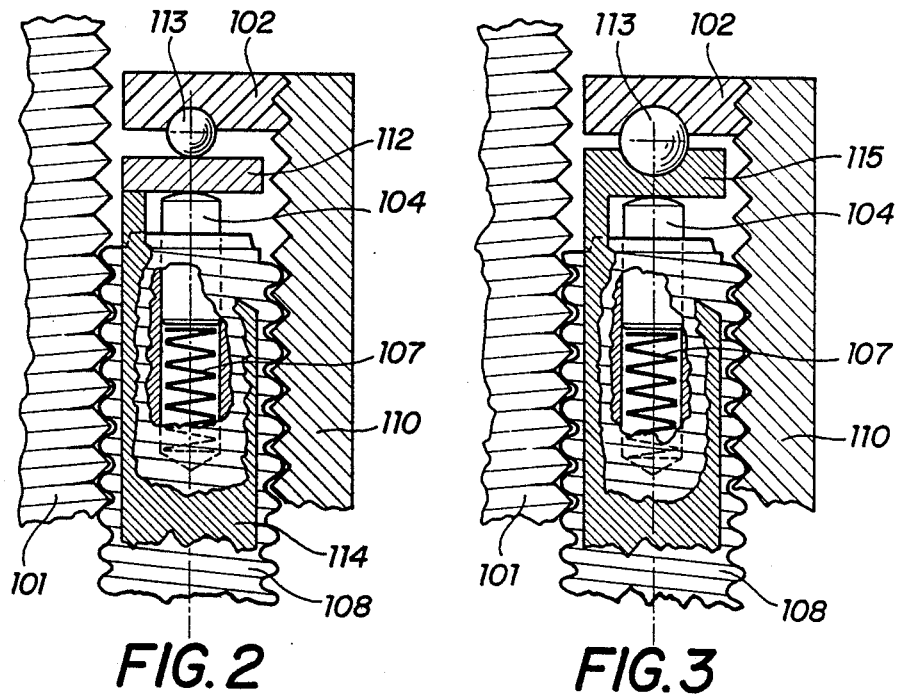
FIGS. 2 to 4 are detailed sectional views of various arrangements for holding the pin.

FIG. 2 shows a second embodiment, in which the pin 104 bears against the cap 102 by way of a ball race consisting of a set of balls 113 and a washer 112, which are parts available commercially. This improvement is particularly important when the screw is in continuous use and the permanent sliding friction of the pins against the cap cause heating and loss of mechanical power. A rolling groove may be provided on one or both surfaces, according to the size of the balls retained therein.

FIG. 3 shows a third embodiment of the invention, in which the above-mentioned washer forms an integral part of the roller cage to constitute one and the same piece 115. In this arrangement, the sliding frictions of the preceding version, in particular between the pins or the cage and the cap, are totally eliminated so as to leave only slight rolling frictions at the level of the balls 113. The cost of this mechanism is, however, slightly higher.

In cases where the rollers only move slightly between each recirculation, for example by less than 8 mm, either due to a low screw pitch or due to the process explained hereinafter with reference to FIG. 5, the roller cage 114, which is complicated to manufacture, may be replaced by two modified washers 117, an upper and a lower, shown in FIG. 4. These thick washers have deep recesses 118 around their circumference to accommodate rollers 108. These rollers are modified in the sense that each roller is provided at each end with a smooth part 105 which is slightly smaller in diameter than the width of the recess 118.

Figure 4:
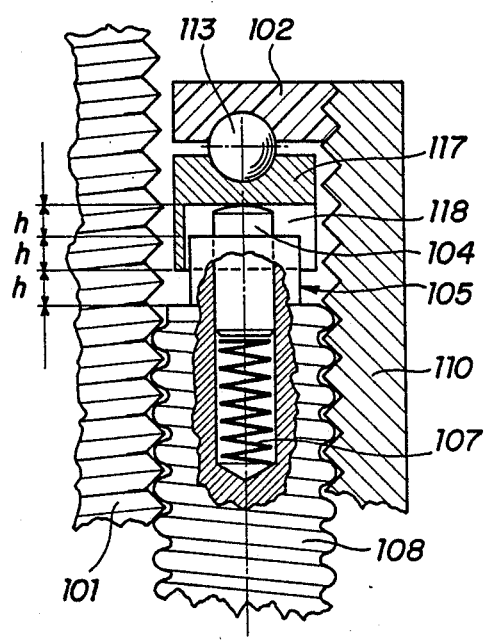

It will be clear from FIG. 4, in which the roller 108 is exactly in its mid-position in relation to the nut 110, that the depth of the recess 118 and the length of the smooth part 105 are at least more than twice the maximum excursion h of the roller 108 between consecutive recirculations. A ball race 113 again reduces the frictional forces as in the preceding case and hence reduces the loss of mechanical power.

In addition to the increased simplicity of the mechanism, this arrangement enables the rollers to be placed closer together so that the number of rollers which can be accommodated in a given circumference can be increased, with the result that the maximum axial load on the screw may be increased. It has also been found that each reinsertion of a roller between the threads tends to realign the two washers 117 in relation to one another.

Figure 5:
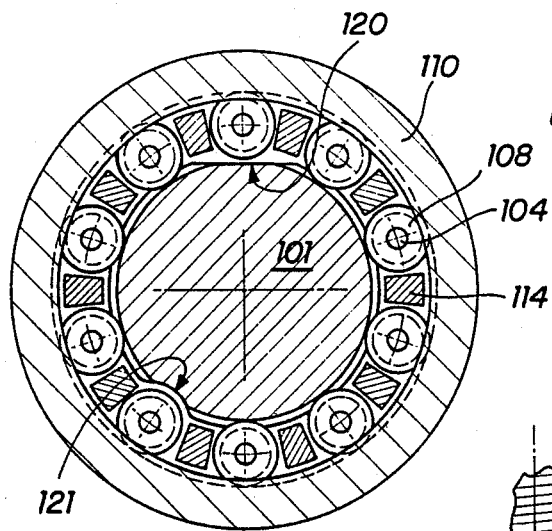
FIG. 5 represents a transverse section through another embodiment of the clearance groove.

Since the position of the clearance groove 106 is now not dependent upon the position of the cam, it is found advantageous to cut this groove on the threaded screw itself, for example in the form of a flat area 120 extending longitudinally on the screw, as shown in FIG. 5. This may be produced quite simply by cutting across the screw.

A second form of recess 121 which is provided by a circular area extending longitudinally on the screw completely eliminates any sharp angle and thereby provides additional flexibility for the re-entrance of the roller 108 between the threads after recirculation.

More important is the fact that in this arrangement, recirculation of the roller takes place not after one complete rotation of the roller round the nut, in other words after a longitudinal displacement equal to one screw pitch, but as soon as the groove on the screw catches the roller, which occurs much sooner. The frequency and position of recirculation of a given roller depend basically on the external diameter of the screw and the internal diameter of the nut where the respective threads are situated. The proportions of the mechanism shown in FIG. 5, for example, imply that a roller will be recirculated after it has performed only ⅔ of a turn round the nut. At that stage, the roller has been displaced longitudinally by ⅔ of the value of the screw pitch. The space in the nut over which the rollers move can thus be reduced, as indicated by the distance h in FIG. 4. Conversely, for a given amount of space for movement, for example 6 mm, it becomes possible to cut a thread with multiple entry and greater pitch into the nut. Such a thread is manufactured more rapidly than a single entry thread.

It is important to note that the recirculation of all the rollers no longer takes place at a single point but over the whole circumference of the nut so that the mechanism operates symmetrically about the central axis.

In the case of threaded screws of large diameter, implying a large number of rollers surrounding the screw, it may be advantageous to cut several clearance grooves equidistantly round the perimeter of the screw for more frequent recirculation.

Figure 6:
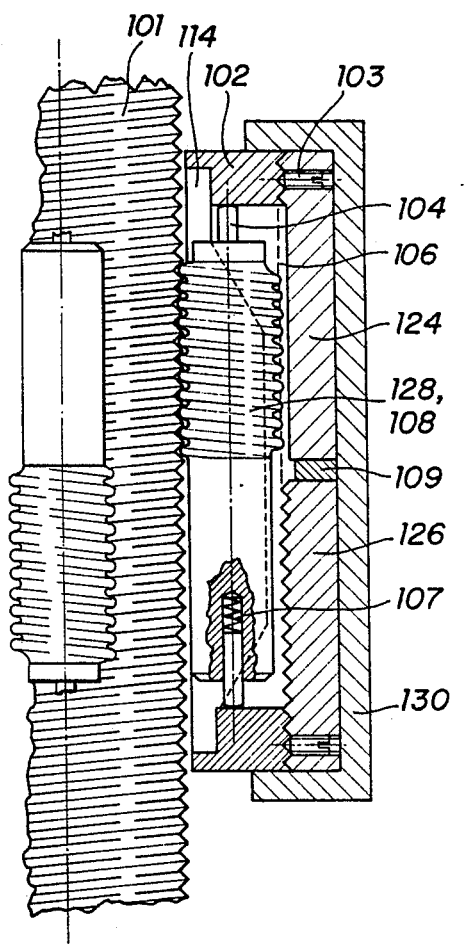
FIG. 6 represents a longitudinal section through a variation of the roller.

It may in some circumstances be necessary to "precharge" the screw, either to eliminate all axial play between the threaded screw and the nut or to increase the rigidity of the device or to increase the minimum couple required to initiate rotation of the screw. Such a precharging device is illustrated in FIG. 6, which shows the nut composed of an upper part 124 and a lower part 126, which are both threaded, and a calibrated key 109, the whole arrangement encased in a box 130. The thickness of the key 109 is slightly less or greater than the pitch of the screw. When the thickness of the key is less than the screw pitch, all the threads cut into the part 124 bear downwards on the roller 128 while the threads cut into the part 106 bear upwards against the same roller. The roller is therefore forced against the threaded screw. This tightening action increases the rolling friction and hence the minimum couple required to commence rotation of the screw.

In this situation, a hard point would appear at the moment of reintegration of a roller between the threads. In order to halve the intensity of these wedging actions, the rollers 128 in FIG. 6 have one half smooth and the other half grooved. These rollers 128 are arranged alternately in opposite directions round the screw, that is to say an "upper" roller is followed by a "lower" roller and these are recirculated alternately. The upper clearance groove may be staggered in relation to the lower one and this staggering may take into account the necessity or otherwise of recirculating two rollers simultaneously. This arrangement thus respects the symmetry of operation about the median section.

The progress provided by the invention to screws with recirculated rollers is equally applicable to small mechanisms and large units. The screw shown in FIG. 1, which is, characterized among other features by the pins bearing directly against "Teflon" caps and by the clearance groove being placed inside the nut is preferred for acting on a small piece such as a linear potentiometer to take an example from electronics. This screw corresponds to the simplest basic form at present available. The choice of options such as the ball race, the replacement of the roller cage by the washer 117, the positioning of the clearance groove on the nut or on the screw and the use of rollers which are partly smooth is made according to the particular use for which each screw is intended and the technical and economic requirements.

For a heavy piece which does not change in position by more than a millimeter, the screw used for handling it requires thick screw threads and hence a large screw pitch. In such a case, it is preferable to use a retaining washer 117 circulating on a ball race and a threaded screw which itself has one or more clearance grooves 121 to limit the longitudinal displacement of the rollers.

For efficient lubrication right up to the level of the springs 107, it may be advantageous to form a longitudinal aperture at each end of the pin.

I claim:

1. A device for providing rotation and longitudinal displacement of a screw comprising a threaded nut; a threaded screw centrally positioned within said nut by a set of rollers, said screw having a circumference and said set of rollers being arranged around said circumference; at least one clearance space for the recirculation of said rollers; a cap attached to each end of the nut leaving a free passage for said screw but retaining each of the rollers in said set of rollers inside the nut; and elastic means associated with the rollers for returning each roller to a substantially central position in the nut when the roller is positioned in said at least one clearance space, wherein the returning is caused by a force of the elastic means which builds during translation of each roller toward one of said caps while the roller is positioned out of said at least one clearance space.

2. The device according to claim 1, wherein said elastic means comprise a cavity formed longitudinally in the axis of the roller; a pin positioned in the cavity; and a spring which pushes the pin out of the cavity and against said cap.

3. The device according to claim 1, wherein the cap at each end is constructed from a plastic material.

4. The device according to claim 1, wherein the cap at each end is constructed from "Teflon".

5. The device according to claim 1, wherein the cap at each end is constructed from nylon.

6. The device according to claim 1, further including a cage adapted to hold the rollers in position in relation to one another.

7. The device according to claim 6, wherein said elastic means of each roller bear against a ball race comprising one of said caps, a set of balls, and a retaining washer.

8. The device according to claim 7, wherein said ball race includes a track in which said set of balls are seated.

9. The device according to claim 8, wherein said track is located in the retaining washer.

10. The device according to claim 8, wherein said track is located in the cap.

11. The device according to claim 8, wherein said track is located in both said cap and said retaining washer.

12. The device according to claim 8, wherein said retaining washer is an integral part of said cage.

13. The device according to claim 7, wherein said retaining washer in an integral part of said cage.

14. The device according to claim 1, wherein said elastic means of each roller bear against a ball race comprising one of said caps, a set of balls, and a retaining washer.

15. The device according to claim 14, wherein said ball race includes a track in which said set of balls are seated.

16. The device according to claim 1, wherein said rollers are held in position in relation to one another by upper and lower thick washers; said washers include recesses positioned around the circumference to accomodate the rollers; and the rollers include smooth portions that are slightly smaller than the recesses.

17. The device according to claim 16, wherein the rollers have a maximum movement (h) between consecutive recirculations, and the recesses have a depth and the smooth portions have a length that are at least twice said maximum movement (h).

18. The device according to claim 1, wherein at least one clearance space is located in the screw.

19. The device according to claim 18, wherein said at least one clearance space comprises a flat area extending longitudinally on the screw.

20. The device according to claim 18, wherein said at least one clearance space comprises a circular area extending longitudinally on the screw.

21. The device according to claim 1, wherein the cap attached to each end comprises a screw cap.

22. The device according to claim 21, including means for precharging the screw to eliminate substantially all axial play.

23. The device according to claim 22, wherein only half of a roller is equipped with threads, the remainder of the roller being smooth, and the rollers are alternately arranged in opposite directions around the circumference of the screw, with a roller having a threaded portion on top being followed by a roller having a smooth portion on top.

* * * * *